Oct. 2, 1951 F. PRIOR 2,569,494
VEHICLE FUEL TANK ASSEMBLY
Filed March 16, 1949 2 Sheets-Sheet 1
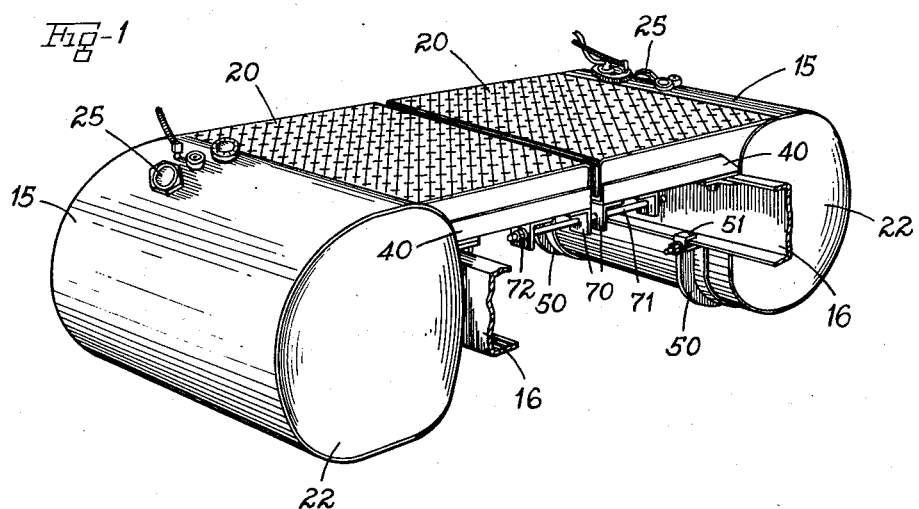
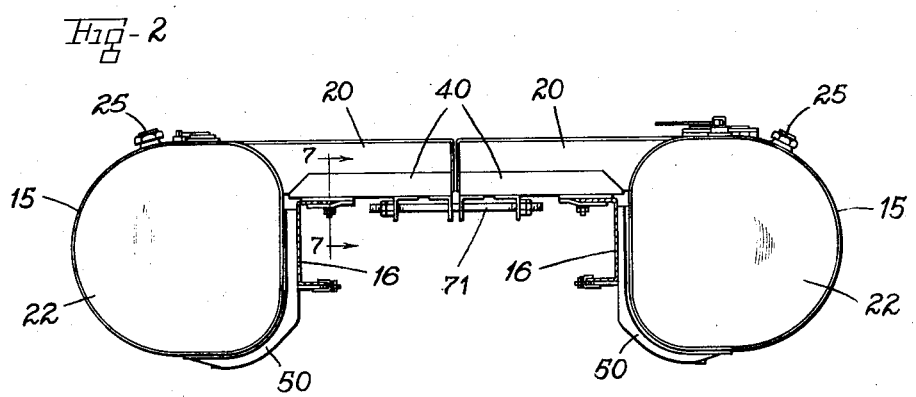
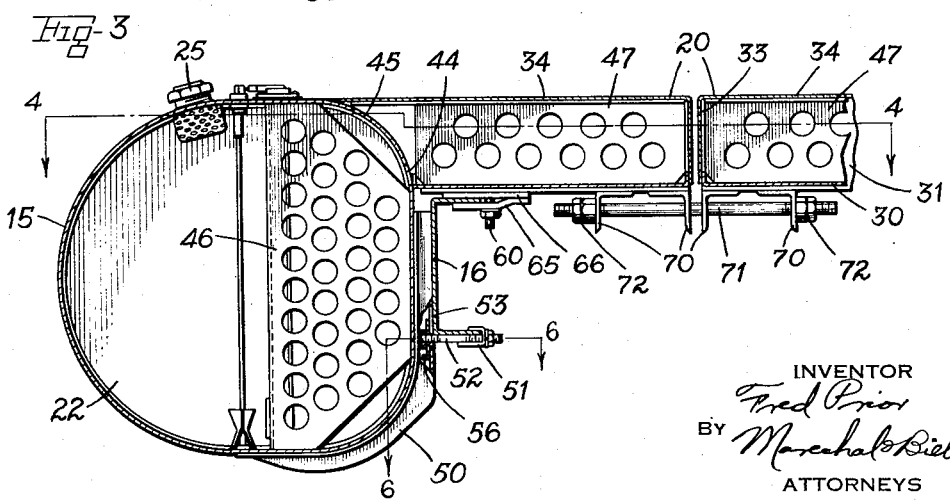
INVENTOR
Fred Prior
BY Marshal Biebel
ATTORNEYS

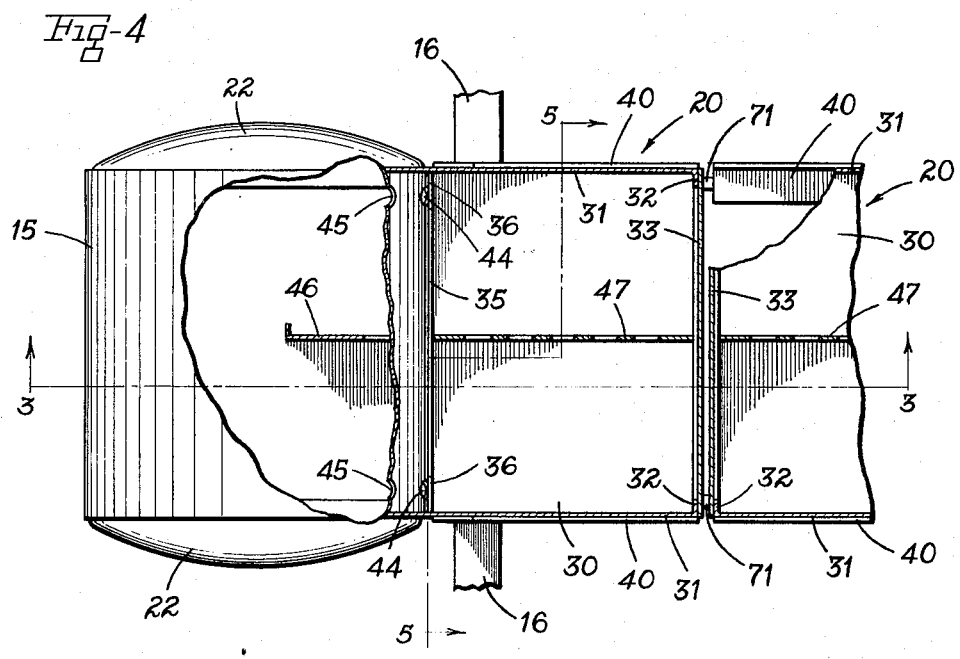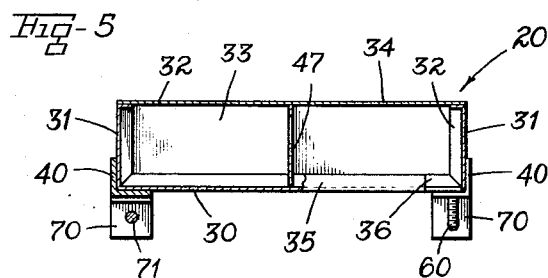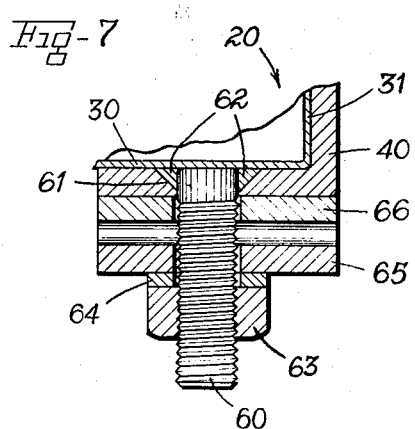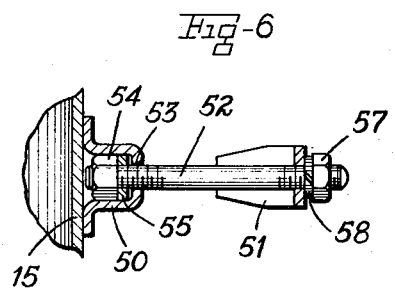

Patented Oct. 2, 1951

2,569,494

UNITED STATES PATENT OFFICE 2,569,494

VEHICLE FUEL TANK ASSEMBLY

Fred Prior, Dallas, Tex.

Application March 16, 1949, Serial No. 81,680

7 Claims. (Cl. 280—5)

This invention relates to fuel tanks for use by trailer trucks and like motor vehicles.

The invention has particular relation to fuel tanks of the type designed for mounting in overhanging relation with the frame of a trailer truck or like motor vehicle, and one of the principal objects of the invention is to provide a fuel tank assembly of this type in two sections which are constructed to be secured together by an adjustable connection in such a manner as to fit properly on frames of different sizes and to give high storage capacity for fuel with maximum stability and without undesirable bulk.

In accordance with the invention there is provided a fuel tank assembly composed of two tank units, each of which includes a generally cylindrical main shell adapted for horizontal mounting along the outer side of the frame and a lateral shell projecting from the upper portion of the main shell inwardly of the frame and with the interior thereof communicating with the interior of the main shell. Both of these shells are provided with external reinforcing members, and these reinforcing members are in turn equipped with attachments for forming clamped connections directly to the frame channels commonly employed on tractors for trailer trucks. In addition, the lateral shell of each unit is provided with brackets adapted to be connected with the similar brackets on the lateral shell of the other unit, and connecting bars are provided for rigidly interconnecting these brackets to secure the two units together in the proper lateral spacing for close fitting mounting on a truck frame of a given size.

The invention accordingly has among its objects the provision of a fuel tank assembly of the above characteristics, and particularly the provision of such an assembly wherein the tank shells include adequate reinforcing members at the positions subject to stress in use for maximum safety without undesirable fits.

It is also an object of the invention to provide such a fuel tank assembly which is quickly adjustable to the proper width in accordance with the size of a given truck frame before being mounted thereon and without requiring the drilling of holes or other machining operations, and thus to minimize the time and labor required for installing the assembly on a truck.

Other objects and advantages of the invention will be apparent from the following description, the accompanying drawings and the appended claims.

In the drawings—

Fig. 1 is a view in perspective illustrating a mounted fuel tank assembly in accordance with the invention with the vehicle frame shown fragmentarily;

Fig. 2 is a view of the mounted assembly in end elevation, and with the vehicle frame in section;

Fig. 3 is a vertical section through one of the tank units of the assembly and a fragment of the other, the view being in section substantially on the line 3—3 of Fig. 4;

Fig. 4 is a plan view similar to Fig. 3, the view being partly broken away and in section substantially on the line 4—4 of Fig. 3;

Fig. 5 is a section through the lateral shell of one of the units, the view being taken on the line 5—5 of Fig. 4 with the unit removed from the frame;

Fig. 6 is an enlarged fragmentary view taken in section on the line 6—6 of Fig. 3; and Fig. 7 is an enlarged fragmentary view taken on the line 7—7 of Fig. 2.

Referring to the drawings, which illustrate a preferred embodiment of the invention, Figs. 1 and 2 show a complete fuel tank assembly comprising a pair of separate tank units each including a main shell 15 mounted in horizontal position along the outside of one of the frame channels 16 of a truck. Each unit also includes a lateral shell 20 of generally rectangular configuration extending inwardly from the upper portion of main shell 15 above channel 16, and the interior of lateral shell 20 is in direct communication with the interior of main shell 15 to form the two shell portions into effectively a single tank.

The construction and internal arrangement of each tank unit are shown in enlarged detail in Figs. 4 to 7. Each main shell 15 is generally cylindrical in transverse section, having flattened portions along the inboard side adjacent channel 16 and also along the top and bottom in accordance with the disclosure of applicant's copending application Serial No. 782,349, filed October 27, 1947. Each main shell is provided at each end with a belled head 22, and the pump connections, filler caps 25 and other fittings are shown in Fig. 1 as being positioned as far forward on the upper surface on each main shell as practicable, this arrangement being advantageous for use on the tractor of a trailer truck to minimize danger of damage from contact with the nose of the trailer if the tractor should encounter an abrupt incline.

The bottom 30 of each lateral shell 20 is formed from a single blank of suitable sheet stock, such as 12-gage hot-rolled steel, folded upwardly to form front and rear end walls 31. This sheet is also flanged at 32 along its upper edges and its inboard edge to provide welded lap joints to the inboard side wall 33 and top 34, these portions 33 and 34 being formed from a second blank of sheet steel. A similar flange 35 is formed along the outboard edge of the bottom 30 for connection to the main shell, but it will be noted that this flange is relieved at each end thereof, as indicated at 36 in Fig. 5. The front and rear lower edges of the lateral shells are reinforced by angle irons 40, which receive the lower edges of the lateral shells and are welded thereto as shown in Fig. 5.

Free transmission of fluid between the shells 15 and 20 is provided for by a pair of holes 44 pierced in the wall of the main shell 15, each of these holes being located opposite one of the relieved ends 36 of the flange 35, as shown in Fig. 4. Thus with these holes 44 positioned adjacent opposite lower corners of the lateral shell, complete drainage to the main shell 15 is assured regardless of the fore and aft position of the tank unit. A similar pair of holes 45 is pierced in the main shell just below the top of the lateral shell to serve as air vents. It will also be noted that each shell is provided with a baffle plate to support the flat surfaces thereof and to subdue the inertia of the fore and aft rush of fluid, the baffle 46 for the main shell and baffle 47 for the lateral shell each being formed of steel plate perforated with staggered holes of substantial diameter to reduce weight without impairing any structural functions.

The main shell 15 of each unit is provided with a pair of J-shaped reinforcing channel members 50, which are formed to fit the inboard and bottom surfaces of the shell and are arc welded thereto. The vertical section of each of these channels 50 bears against the outer surface of the adjacent frame channel 16, and it is clamped thereto as shown in Figs. 3 and 6 by means of a hook type clamp 51 and a stud bolt 52 which passes through a slotted opening 53 in channel 50 and engages a nut 54 tack welded to a rectangular washer 55 of sufficient size to be held against turning within channel 50. A stop member 56 is welded within each channel 50 just below the lower end of slot 53 to limit downward movement of the nut and washer 54—55 for facilitating assembly operations, and each bolt 52 is provided adjacent clamp 51 with a nut 57 and lock washer 58. The slot 53 and stud bolt arrangement thus provide ready adjustability of clamp 51 for frame channels 16 of different sizes to secure shell 15 in rigid lateral relation with the frame.

The lateral shell 20 of each unit is also clamped directly to the adjacent frame channel 16. A stud bolt 60 has its upper end inserted in a countersunk hole 61 (Fig. 7) in the angle 40, and this bolt is securely welded to the angle as indicated at 62 in Fig. 7, the weld being carried completely around the upper end of the bolt and filling the countersunk portion of hole 61 to give a strong weld with good penetration. The bolt 60 is provided with a suitable nut 63 and lock washer 64, and it cooperates with a bar clamp 65 and a spacer plate 66 to clamp the tank unit to the upper flange of the channel. As shown in Fig. 3, the ends of the clamps 65 are relatively offset to compensate for the thickness of channels 16 in order to maintain the clamping surfaces as nearly parallel as possible.

Additional means are provided for securing the lateral shells of the two units together in adjustably spaced relation in accordance with the width of a given truck frame and also for bracing the units together against tilting movement relative to the frame. As shown, two angle brackets 70 are welded to the under surface of each of the angles 40 in spaced relation laterally of the frame and with one leg thereof extending downwardly in a vertical plane arranged lengthwise of the frame. One bracket of each of these pairs of brackets is positioned with its downwardly extending leg adjacent the inboard end of the lateral shell, and the other bracket of the pair is spaced outwardly therefrom. A pair of cylindrical bars or studs 71 extends through opposite pairs of these brackets 70 in both of the lateral shells, the studs 71 being of sufficient length, as shown in Fig. 3, to extend completely through all four aligned brackets 70. Each end of the studs 71 is threaded, and lock nuts 72 are provided for each of these threaded ends.

In mounting this assembly upon a truck frame, the two units may be first connected together by means of the studs 71, the nuts 72 being tightened only sufficiently to leave the two units in adequately spaced relation for mounting on the frame. The whole assembly can then be readily mounted on the frame in the same manner as a unitary saddle tank and the clamps 51 and 65 secured to the channel 16. Thereafter, the nut 72 may be tightened on studs 71 to secure the two lateral shells rigidly together, and it will be noted that this construction and arrangement provide for quickly and simply mounting the assembly on the frame with a minimum of labor and without requiring any fitting or machining operations such as the drilling of holes or the like.

It will accordingly be seen that the invention provides a fuel tank assembly which is quickly adaptable to mounting on truck frames of many different sizes and widths, and which also gives substantially the same fuel capacity as a unitary saddle tank without having to be made in a range of different sizes to fit on different frames. This construction also is strong and rigid, and it promotes safety in use. Thus it will be seen that the arrangement of brackets 70 and studs 71 reinforces the clamped connections to the frame channels, and also it counteracts any tendency towards tilting of the individual unit with respect to the frame channels resulting from the downwardly directed forces effective on the main shells 15 from the greater bulk of fuel therein as compared with the lateral shells. It also has been found with this construction that twisting resulting from deflection of the truck frame is substantially absorbed in the connection between the two tank units without injury to the tanks themselves such as might result if they were integrally connected or parts of a unitary saddle tank. In addition, since the nuts 72 can be tightened to the maximum extent after the clamped connections between the tanks and the frame channels have been made, this assures that the main tank shells are maintained in the desired close and rigidly engaged relation with the frame channels to assure stability and balance for proper safety, leaving no lateral clearance between the overhanging portions of the units and the channel frames which could permit relative angular movement of these parts during operation of the truck and resulting development of stresses at the connections between the two units.

This application is a continuation in part of my application Serial No. 30,165 filed May 29, 1948.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A fuel tank assembly of the character described for mounting on the frame of a motor vehicle and comprising a pair of structurally separate tank units, each said unit including a generally cylindrical main shell adapted for horizontal mounting along the outer side of said frame and a lateral shell projecting from the upper portion of said main shell with the interior thereof communicating with the interior of said main shell, means for mounting said units on said frame with said main shells in closely overhanging relation with the outer sides of said frame and with said lateral shells extending inwardly of and above said frame into predetermined spaced relation with each other in accordance with the width of said frame, connecting members extending between said lateral shells, and means for adjustably securing said connecting members to said lateral shells with said lateral shells in said predetermined spaced relation to maintain said main shells in said close relation with said frame irrespective of the width of said frame.

2. A fuel tank assembly of the character described for mounting on the frame of a motor vehicle and comprising a pair of separate tank units, each said unit including a main shell adapted for horizontal mounting along the outer side of said frame and a lateral shell projecting from the upper portion of said main shell with the interior thereof communicating with the interior of said main shell, reinforcing members secured to each of said main shells, means for directly connecting each of said reinforcing members to said frame to support said units with said lateral shells extending inwardly of and above said frame, connecting members extending between lateral shells, and means for adjustably securing said connecting members to said lateral shells with said lateral shells in predetermined spaced relation in accordance with the width of said frame to maintain said main shells in said directly connected relation with said frame.

3. A fuel tank assembly of the character described for mounting on the frame of a motor vehicle and comprising a pair of separate tank units, each said unit including a main shell adapted for horizontal mounting in close relation with the outer side of said frame and a lateral shell projecting from the upper portion of said main shell with the interior thereof communicating with the interior of said main shell, means for securing said main shell of each said unit directly to said frame with said lateral shell extending inwardly of and above said frame, brackets projecting from said lateral shells, and means for adjustably connecting said brackets together to secure said units together in spaced relation in accordance with the width of said frame.

4. A fuel tank assembly of the character described for mounting on the frame of a motor vehicle and comprising a pair of separate tank units, each said unit including a main shell adapted for horizontal mounting in close relation with the outer side of said frame and a lateral shell projecting from the upper portion of said main shell with the interior thereof communicating with the interior of said main shell, means for securing said main shell of each said unit directly to said frame with said lateral shell extending inwardly of and above said frame, a plurality of brackets extending downwardly from each of said lateral shells in spaced relation laterally of said frame, and means including bars extending through said brackets for connecting said lateral shells together and for bracing the inner ends of said units against upward movement as a result of downwardly directed forces effective on said main shells.

5. A fuel tank assembly of the character described for mounting on the frame of a motor vehicle and comprising a pair of separate tank units, each said unit including a main shell adapted for horizontal mounting in close relation with the outer side of said frame and a lateral shell projecting from the upper portion of said main shell with the interior thereof communicating with the interior of said main shell, reinforcing members for said lateral shells extending across the under surfaces thereof laterally of said frame, a bracket extending downwardly from each of said reinforcing members, means extending below said lateral shells for connecting said brackets to secure said units together in spaced relation in accordance with the width of said frame, and means for securing each said unit directly to said frame to counteract tendencies toward upward movement of the inner ends of said lateral shells resulting from the downwardly directed forces effective on said main shells.

6. A fuel tank assembly of the character described for mounting on the frame of a motor vehicle and comprising a pair of separate tank units, each said unit including a main shell adapted for horizontal mounting in close relation with the outer side of said frame and a lateral shell projecting from the upper portion of said main shell with the interior thereof communicating with the interior of said main shell, angle bars extending laterally of said frame along the lower corners of said lateral shells to reinforce the same, a pair of angle brackets secured to each said angle bar and extending downwardly therefrom in spaced vertical planes arranged generally lengthwise of said frame, bars extending laterally of said frame through opposed pairs of said brackets in each said lateral shell to brace said lateral shells against relative tilting movement, and adjustable means for securing said bars to said brackets with said units in properly spaced relation in accordance with the width of said frame.

7. A fuel tank assembly of the character described for mounting on the frame of a motor vehicle and comprising a pair of separate tank units, each said unit including a main shell adapted for horizontal mounting in close relation with the outer side of said frame and a lateral shell projecting from the upper portion of said main shell with the interior thereof communicating with the interior of said main shell, reinforcing members for said lateral shells extending across the under surface thereof laterally of said frame, means secured to said reinforcing members adjacent said frame and projecting downwardly therefrom, and means cooperating with said downwardly projecting means for clamping said lateral shells directly to said frame to avoid tilting of said units about said frame resulting from the downwardly directed forces effective on said main shells.

FRED PRIOR.

REFERENCES CITED

The following references are of record in the file of this patent:

UNITED STATES PATENTS

| Number | Name | Date |
|---|---|---|
| 1,341,215 | Kramer | May 25, 1920 |
| 2,181,772 | Snyder | Nov. 28, 1939 |
| 2,314,298 | Welch | Mar. 16, 1943 |
| 2,357,148 | Turner | Aug. 29, 1944 |